United States Patent [19]

Hong et al.

[11] 3,996,182

[45] Dec. 7, 1976

[54] WATER-BASED CAN COATING COMPOSITION AND METHOD OF MAKING SAME

[75] Inventors: Myung K. Hong; Edward J. Holzrichter, both of Riverside; Edward A. Lasher, Beverly Hills, all of Calif.

[73] Assignee: Whittaker Corporation, Los Angeles, Calif.

[22] Filed: June 12, 1975

[21] Appl. No.: 586,785

[52] U.S. Cl. .............. 260/29.6 NR; 260/31.4 EP; 260/32.8 EP; 260/33.2 EP; 428/418; 428/457

[51] Int. Cl.² .................. C08K 5/06; C08K 5/07; C08K 5/10; C08L 63/00

[58] Field of Search ............ 260/29.6 NR, 31.4 EP, 260/32.8 EP, 33.2 EP

[56] References Cited

UNITED STATES PATENTS

| | | | |
|---|---|---|---|
| 3,177,092 | 4/1965 | Meyers et al. | 260/31.4 EP |
| 3,219,729 | 11/1965 | Meyers et al. | 260/31.4 EP |
| 3,563,929 | 2/1971 | Guldenpfenning | 260/29.6 NR |

OTHER PUBLICATIONS

B526,997, Jan. 1, 1976, Tobias et al., 260/31.4 EP

*Primary Examiner*—Harry Wong, Jr.
*Attorney, Agent, or Firm*—Whittaker Corporation

[57] ABSTRACT

A water-reduced coating composition is made by admixing water with a concentrate comprising: (1) a water-reducible, low molecular weight ester compound; (2) a modified epoxy amine salt; (3) a highly functional cross-linking agent; and (4) a coupling solvent for coupling the epoxy amine salt to water. Preferably, a low boiling component is included in the coating composition to facilitate removal of the water therefrom during cure.

34 Claims, No Drawings

3,996,182

WATER-BASED CAN COATING COMPOSITION AND METHOD OF MAKING SAME

BACKGROUND OF THE INVENTION

This invention relates to coatings compositions and, more particularly, relates to water-reduced coatings compositions for metal containers.

As is well known, cans which may be made of steel, tin, aluminum and even combinations of these materials have been, and continue to be, used as containers for food and beverages (beer, soda pop, etc.). In order to protect the contents of these containers from contamination by the container metals, it is required that the interiors of such containers be coated with a coating which is essentially inert to each container's contents and which provides an effective barrier between the container and its contents, some of which can be quite acidic.

At present, organic solvent-based epoxy-urea coatings are primarily used as interior can coatings. Use of these coatings requires that the containers first be subjected to a cleaning operation in order to prepare the surfaces of the container for application of the coating. This cleaning step is in addition to the usual cleaning operation employed to remove dirt and oil. The surface preparation cleaning solutions presently employed are principally chromium-based compositions which present a very real water pollution problem when they are disposed of. After the containers have been cleaned as described, an exterior coating is usually applied to beverage containers followed by an inking step which serves to label the containers. These steps are accompanied by separate baking cycles to cure both the base coating and inking materials. Only after all of these steps have been completed is the interior of the container coated.

The presently-employed can coating method which has been described is characterized by several disadvantages, one of which (the chromium cleaning procedure) has already been referred to. A second disadvantage results from the use of the organic solvents which form a volatile component which is evaporated from the film-forming composition during cure of the latter. In order to meet various pollution standards, the organic solvent gases produced during cure must be channeled through an afterburner in order to convert them to less harmful elements. The use of afterburners itself presents an energy conservation problem due to our limited energy resources.

Food containers are usually covered with a paper label rather than the ink label hereinbefore referred to. The paper label is placed over the exterior of the can after the latter has been subjected only to the chromium-cleaning step. However, if the cans are made of steel, they will rust in time. Even if the steel cans are tin clad (for purposes of facilitating drawing the metal to form cans), localized rusting may still occur. Therefore, it would be advantageous to eliminate this rusting problem by use of a coating which is easily and inexpensively applied.

SUMMARY OF THE INVENTION

This invention is embodied in a method and means of making a water-reduced coatings composition which is particularly suitable for coating both the interior and exterior of food and beverage cans although it can be used for other purposes. More specifically, the described coating is made by curing a film-forming composition which comprises (1) a water-reducible, low molecular weight ester compound; (2) a modified epoxy resin having pendant carboxyl groups attached thereto; (3) a highly functional cross-linking agent; (4) an amine for reversible salt formation with the pendant carboxyl groups of the modified epoxy resin; (5) water; and (6) a coupling solvent for coupling the modified epoxy resin and ester compound to the water. Preferably, a low-boiling component which forms an azeotropic composition with water is also included in the film-forming composition. Other components may also be included in the film-forming composition as is well known in the art.

The resulting film-forming composition can be cured to form a very thin and very durable coating exhibiting good flexibility, hardness and chemical resistance. Additionally, the described film-forming composition exhibits excellent flow characteristics and provides the desired protection at film thicknesses as low as about 0.0025 mm.

Furthermore, use of the herein-described coatings results in a substantial reduction in air pollution (as compared with prior container coatings) without the use of afterburners due to the fact that a major portion of the non-volatile component of the film-forming composition is water. A further advantage stems from the fact that a can can be coated with the described composition without the need to use surface-preparation cleaning compositions such as the presently employed chromium compositions. Dispensing with this step, of course, reduces water pollution. Another advantage derives from the fact that both the interior and exterior of a can can be coated with the herein-described film-forming composition in a single operation, thereby eliminating the need for separate interior and exterior coating operations with their attendant numerous baking or curing steps. With respect to food cans, there is also an advantage in that paper labels can be applied directly to containers coated with this composition without the cans later rusting. A still further advantage is that with respect to those containers to which an exterior base coating is applied prior to inking, that base coating can be eliminated with inking taking place over the herein-described coating.

DESCRIPTION OF THE PREFERRED EMBODIMENT

The film-forming composition described herein comprises water and "concentrate." The latter, in turn, comprises as essential components: (1) a water-reducible, low molecular weight ester compound; (2) a modified epoxy resin having pendant carboxyl groups; (3) a melamine/urea cross-linking component; (4) an amine; and (5) a coupling solvent. Optionally, a small amount of water may be included in the concentrate. Preferably, the concentrate also includes a low-boiling component which forms an azeotropic mixture with water. Other components which are well known in the coatings field, such as bubble-breakers, flow agents, pigments, etc., may also be included in the concentrate.

In general, the concentrate is made up and sold by the coatings manufacturer and the end-user adds the water to the concentrate to produce the water-based film-forming composition. The latter is coated on a surface and cured at elevated temperatures. During the cure, the amine, water and organic solvent (and any low-boiling azeotrope-forming component) are removed from the film-forming composition so that the cured composition is essentially an all-organic system (with the exception of inorganic pigments and the like).

Each of the components of the herein-described film-forming composition will now be described.

Ester Component

The ester component is a low molecular weight ester compound which is characterized by having a maximum molecular weight on the order of about 700, but preferably less than about 500, and which is characterized by being reducible with water at pH 7 to at least about 80% by weight non-volatile material. The ester compound preferably has a hydroxyl functionality of about 3 to about 4 although lower hydroxyl functionalities may be employed, provided that the aforementioned water reducibility and molecular weight requirements are met.

The ester compound is made by esterifying a polycarboxylic acid (or mixtures thereof) with a polyol (or mixtures thereof) using molar ratios of the acid and polyol so that the aforementioned molecular weight and water reducibility characteristics are obtained. Because the ester compound is provided with pendant hydroxyls for the purpose of enhancing the water reducibility of the ester compound, the polycarboxylic acid/polyol molar ratio is such as to provide at least about a 100% excess of hydroxyl groups over the number of carboxyl groups. Depending upon which polyols and polycarboxylic acids are used in a particular application to formulate the ester compound, the latter will usually be a di-, tri- or tetraester as compared to the typical polyesters of the prior art.

Useful polyols include the aliphatic polyols having from 2–4 hydroxyl groups and having 2 to about 7 carbon atoms. Preferably, the polyols contain one or more internally-located oxygens in the form of ether linkages to provide the resulting ester component with greater water reducibility.

Specific examples of useful polyols are: neopentyl glycol, triethylene glycol, tetraethylene glycol, diethylene glycol. ethylene glycol, 1,6 hexane diol, trimethylol ethane, trimethylol propane, trimethylol butane, glycerine and pentaerythritol.

The polycarboxylic acids usable herein are di- and tri-carboxylic acids and include both aliphatic and aromatic acids. However, it is preferable to use aromatic polycarboxylic acids to reduce the rate of hydrolysis of the ester to its constituent components.

Useful carboxylic acids for making the ester compound include phthalic, isophthalic, tetrahydrophthalic, terephthalic, hexahydrophthalic, endomethylene tetrahydrophthalic, trimellitic, malonic, succinic, glutaric, adipic, suberic, azelaic, trimethyl adipic, sebacid and succinic acids. Anhydrides of the foregoing acids may also be effectively used.

The ester component is prepared using standard esterification techniques. For example, the reactants (polycarboxylic acid and polyol) are first charged to a reactor equipped with agitator, heater, inert gas supply, condenser, condenser trap and decanter. The oxygen (air) in the reactor is substantially replaced by the inert gas, e.g., carbon dioxide, and the heater is turned on to raise the reactor contents to a temperature at which esterification of the reactants take place at a suitably rapid rate. Exemplary temperatures are on the order of about 230° C to about 260° C although both lower and higher esterification temperatures may be used. The reactor contents are held at the selected esterification temperature until an acid number determination indicates that the esterification reaction is substantially complete. The latter result is evidenced by acid numbers below about 10. At higher acid numbers, some of the desired ester component will have been produced, but there will still be significant amounts of unreacted polycarboxylic acid and polyol present in the reaction mixture.

Modified Epoxy Resin

This component is a carboxylic acid-modified epoxy resin which, in its fully modified form, has pendant carboxyl groups attached thereto for promoting the reaction of intermediate (and any other) epoxy resin hydroxyls with the cross-linking component used herein. The pendant carboxyl groups are also reversibly reacted with amines to provide transitory water solubility for the modified epoxy resin to further aid in the film-forming reaction of the ester and modified epoxy resin with the cross-linking agent.

In general terms, the modified epoxy resin (which is an epoxy resin ester) is made by half-ester reaction of an acid anhydride with an epoxy resin partial ester made by the reaction of an epoxy resin with a monocarboxylic acid. A specific method which may be employed to make the hereindescribed modified epoxy resin is described in 51 J. Oil and Col. Chem. Assoc. 108–136 (1968) which is incorporated herein by this reference. To the extent that anything in the referenced journal article is not consistent with the description herein set forth of the modified epoxy resin and its preparation, this description shall prevail.

The epoxy starting constituent of this modified epoxy resin is a low molecular weight epoxy resin formed by the well-known reaction of bisphenol A with epichlorohydrin. This epoxy resin has a molecular weight of about 1000 and an epoxy equivalent weight of about 500. Epoxy resins of substantially higher molecular weight present difficult handling problems at the required non-volatile levels.

The epoxy resin is first reacted with sufficient monocarboxylic acid to open substantially all of the oxirane rings of the epoxy resin. The monocarboxylic acid may be aliphatic or aromatic, but must yield substantially odorless esters for use in coatings for beverage or food containers (as must all the constituents usable herein). Although benzoic acid is preferred, other monobasic acids such as tertiary butyl benzoic acid and stearic acid may be used.

With the opening of each oxirane ring and the attachment to one of the carbons thereof of a carboxyl group (from the monobasic acid), a secondary hydroxyl becomes connected to the other carbon of the (now-broken) oxirane rings and available for further reaction. The resulting epoxy resin partial ester is next reacted with an aromatic (including hydrogenated aromatic) or saturated, aliphatic dicarboxylic acid anhydride. Dicarboxylic acid anhydrides are employed to react with the aforementioned secondary hydroxyls to thereby provide pendant carboxyl groups for salt formation (with amines) for water solubility purposes and for catalysis as described in more detail hereinafter.

The anhydride form is used because the first carboxyl group of each anhydride molecule to react does so readily at the relatively low temperatures used to produce the half-ester reaction; however, the second carboxyl group requires much higher temperatures to enter into an esterification reaction. This means that there is little or no significant cross-linking from the second carboxyl group reacting with a hydroxyl on another epoxy resin partial ester molecule. If such cross-linking was significant, gellation would occur. On the other hand, if the acid form was used, gellation would be difficult to prevent both because the two carboxyl groups react equally readily and because a relatively high temperature must be used so that, once reaction occurs, it occurs quickly with little or no chance to limit the reaction to one carboxyl group on each acid molecule. Any aliphatic dicarboxylic acid anhydride or aliphatic substituent of an aromatic anhydride is saturated to avoid undesirable degradation resulting from oxidative attack during cure of coating.

Useful dicarboxylic acid anhydrides include succinic anhydride, phthalic anhydride and trimellitic anhydride.

Preparation of the modified epoxy resin starts with the reaction of the low molecular weight epoxy resin with the monobasic acid. This reaction is preferably carried out in a reactor vessel fitted with stirrer, heater, condenser and condenser trap. The reactants are added to the reactor vessel together with a fast boiling solvent such as toluene or xylene for removal of the water of esterification and heating is commenced. The reactants are heated to a high temperature, e.g., 205° C – 260° C (400°–500° F), to minimize the polymerization of the epoxy resin with itself and to promote the reaction of the monocarboxylic acid with the epoxy resin. When using benzoic acid as the monocarboxylic acid, it has been found that the desired formation of the epoxy resin benzoate proceeds rapidly with minimal polymerization of the epoxy resin at temperatures on the order of 238° C (460° F).

As the reaction of the monocarboxylic acid with the epoxy resin proceeds at the oxirane ring of the epoxy resin, there is also some esterification of the monocarboxylic acid with the secondary hydroxyls initially present in intermediate positions along the epoxy resin chain. The latter esterification produces some water which is removed as it is formed along with the reaction solvent. If not removed, the water will interfere with the next step, as hydrolysis of the anhydride ring will occur to form the corresponding (and undesirable) dicarboxylic acid.

To ensure that substantially all of the oxirane rings of the epoxy resin are opened and to compensate for "loss" of some of the monobasic acid due to esterification with secondary hydroxyls along the epoxy resin chain, it is preferred to use a small excess of monocarboxylic acid over the stoichiometric amount of two mols of acid per mol of epoxy resin.

The reactants are held at the reaction temperature until the reaction of the monocarboxylic acid with the epoxy resin is substantially complete as indicated by acid number (mg. KOH/gm.) determinations. Preferably, heating is stopped at acid numbers between about 15 and about 10, although heating may be continued to lower acid numbers.

When the reactor vessel contents have cooled to about 160° C (320° F) thereby effectively stopping the reaction of the monobasic acid with the epoxy resin, the dicarboxylic acid anhydride and any solvents to be used are added to the reactor vessel, which now contains epoxy resin partial ester, and heating is resumed.

In general, the amount of acid anhydride to be combined with the epoxy resin partial ester is that which is needed to produce a water-thinnable modified epoxy resin when the latter is combined with the amine. This is done by employing enough equivalents of anhydride to raise the acid number of the epoxy resin partial ester to a desired acid number range. Thus, the reaction of the anhydride with the epoxy resin partial ester is continued until a solids acid number in the range between about 40 and about 70 is obtained. Preferably, the acid number is between about 50 and about 60. Below about 40, the modified epoxy resin will not be sufficiently solubilized in the water/coupling solvent mixture by the addition of amine. This results from cross-linking through esterification of the second carboxyl of each anhydride molecule with a second epoxy resin partial ester molecule with a resultant increase in molecular weight (with attendant reduction in solubility) and a decrease in available carboxyl groups for salt formation with the amine. The reduced number of carboxyl groups (at acid numbers below about 40) also means that there is a reduced catalytic effect in the coating curing step from the carboxyl groups. At acid numbers above about 70, the modified epoxy resin also exhibits poor water/coupling solvent solubility because the anhydride hasn't opened sufficiently and hasn't attached to the epoxy resin partial ester.

A solvent may be included in the epoxy resin partial ester/anhydride reaction mixture to control the viscosity of the latter since the reaction of the anhydride with the epoxy resin partial ester proceeds at relatively low temperatures and extreme viscosities may be encountered at such temperatures in 100 percent non-volatile systems. Any solvent used should not be reactive with the anhydride and should be missible with water. It is preferred to use the ethyl ether of ethyl acetate (Cellosolve acetate) because it aids in the mixing of the anhydride and epoxy resin partial ester.

The reactor vessel contents are maintained at a temperature sufficient to produce an acceptable rate of addition of the dicarboxylic acid anhydride to the epoxy resin partial ester, but at a temperature less than that at which the carboxylic acid generated reacts. When using succinic anhydride, it has been found that good results are obtained when the reactor contents are held at about 149°–160° C (300°–320° F).

The reaction temperature is maintained until acid number determinations indicate that the reaction of the dicarboxylic acid anhydride with the secondary hydroxyls is substantially complete. Since the theoretical acid number at 100 percent completion is about 57, the reaction is preferably halted at an acid number of about 55 ± 5.

Amine

In order to maintain the modified epoxy resin in solution in the water/coupling solvent mixture, it is reacted with an amine which attaches to the pendant carboxyls to form an epoxy amine salt. However, since the purpose of the pendant carboxyl groups is to promote the reaction of the ester compound and the modified epoxy resin with the cross-linking agent in the film-forming step, the amine used herein must be one which is readily removed from the epoxy amine salt structure during cure of the film-forming constituents so that the pendant carboxyl groups will then be free to catalyze the film-forming reaction. Preferably, a medium boiling point amine is used since such amines completely escape from the film-forming mixture without producing surface defects. Amines such as triethanolamine with a high boiling point (but less than the cure temperature), although removed from the epoxy amine salt structure, do not exhibit sufficient volatility to completely escape from the film-forming mixture. By remaining in the film-forming composition, such amines act to retard cure and they can form salts which provide centers for attack in the cured coatings by solvents. On the other hand, low boiling amines such as triethylamine are readily removed from the film-forming composition. However, their removal leads to the formation of coating surface defects.

The useful amines are aliphatic tertiary amines which have medium range boiling points below the temperatures used to cure particular film-forming mixtures. For example, it is presently preferred to use diethylethanolamine (DEEA), dimethylaminomethyl propanol (DMAMP) and dimethylethanolamine (DMEA). Secondary aliphatic amines can catalyze film degradation, and they are presently suspected of being carcinogenic so that their use in interior coatings for food containers is presently not permitted. Primary aliphatic amines tend to be too highly reactive with attendant undesirable results, and they cause film discoloration.

Cross-Linking Component

The cross-linking agent used herein is one which has a large number of reactive sites per molecule so that a densely cross-linked cured coating is produced which is highly immune to attack by solvents including water. Due to the reactive nature of the herein-described cross-linking agent, the resulting coatings comprise a thermosetting system.

Preferably, hexa alkoxy methyl melamines are used as the cross-linking agent. Preferred examples of these melamines are those which include the lower molecular weight alkoxy substituents such as the methoxy, ethoxy, propoxy and butoxy substituents. These preferred melamines provide rapid cure.

In some cases, it may be advantageous to use highly alkylated ureas, such as tetramethylol and tetrapropylol urea, since the ureas are more economical than the melamines. However, aside from economics, the identified melamines are preferred both from a processing standpoint (they provide faster cure) and from a coatings use standpoint (the melamine-based coatings provide substantially better water resistance). The latter factor is particularly important in interior food container coatings since such coatings can be subjected for long periods of time to aqueous solutions which also may be quite acidic.

To take advantage of the economics of ureas while obtaining most of the benefits of the melamines, highly methylated ureas can be used in combination with the melamines, with the latter preferably comprising a major portion of the combination.

Coupling Solvent

If water alone or water plus a low boiling organic solvent which is soluble in water comprise(s) the solvent for the herein-described film-forming composition, discontinuities will result when the latter is cured. The discontinuities result from the fast or early evaporation of such solvents, thereby leaving the other film-forming constituents without a solvent during the entire cure step to hold them together in solution to maintain good application characteristics. To avoid the foregoing problem, organic coupling solvents are employed which couple the water to the modified epoxy resin and which have a sufficiently high boiling point so that they remain in the film until the water is essentially removed, evaporating only in the final stages of cure. Since the water is essentially removed before cure is complete, the result is a cured organic system which is essentially not subject to water attack.

Useful coupling solvents include 2-butoxyethanol (butyl Cellosolve), diacetone alcohol, and Cellosolve acetate. Although each of these coupling solvents has a boiling point well below the usual film cure temperature, their boiling points are sufficiently high so that they are retained in the film until at least most of the water has been evaporated.

Water

While any water can be used, it is preferably to employ water having substantially no metal content such as deionized or distilled water. The use of substantially metal-free water serves to eliminate the formation of metal amine salts which, in the case of can coatings, can build up on the apex region of the dome bottoms of cans causing poor coverage of that region.

The amount of water used can vary widely with the actual amount depending upon such factors as film-forming composition, solids content, air pollution requirements and coating line conditions. Concentrations of water of at least 80 percent by volume of the total volume of volatiles have been used successfully with solids contents of 11% to 13% by volume of the volume of film-forming composition.

Other Components

It is presently preferred to include in the film-forming composition a component which has a relatively low boiling point, which forms an azeotropic composition with water, and which is a solvent for the modified epoxy resin. It is presently believed that such a component promotes the removal of water from the film-forming composition at an early point in the cure of the latter. Such early water removal, in turn, promotes cure of the film-forming composition which can result in an improved film. A particular advantage of using a low boiling, azeotrope-forming component is realized in connection with the coating of the interiors of cans having a domed bottom extending upwardly into the can. When such cans are interiorly coated in an upside-down position, a blister can form at the apex of the dome on its inner surface. However, with the aforementioned low boiling component, flow is promoted to such an extent that such blistering is virtually eliminated.

Various ketones such as methyl ethyl ketone (MEK) and acetone, and esters such as ethyl acetate may be employed as the low boiling, azeotrope-forming component. These materials also provide the further advantages of aiding in stabilizing the water/organic solvent system and providing additional solvent for the modified epoxy resin.

Components such as bubble breakers, flow agents, and slip agents (particularly for external can coating) can also be included in the film-forming composition for the purposes indicated by their designations as is well known. As examples of the foregoing components, mineral spirits (aliphatic hydrocarbons - B.P. about 205° C) can be employed as the bubble breaker, acrylic-modified polyester (Beckosol 13–420) can be employed as the flow agent, and a wax such as carnouba wax (s.g. 0.995; m.p. 84°–86° C) can be used as the slip agent.

Preparation of the Film-Forming Composition

After the various components have been produced and/or assembled as described hereinbefore, the concentrate is first made up.

The ester compound may be included in the concentrate in 100% solids form or a small amount of water, e.g., 10% by weight of water to the total weight of water and ester compound, can be dissolved in the ester for ease of handling.

The modified epoxy resin may be added to the concentrate mixture as the modified epoxy resin or as its amine salt. If added as the modified epoxy resin form, it quickly forms a salt with the amine in the concentrate.

The amount of amine to be included in the concentrate has to be carefully determined because too much or too little amine can have a detrimental effect on the curing of the film-forming composition and on the cured coating itself, respectively. At acidic pH's, the modified epoxy resin will kick out of solution with the result that the cured film will be discontinuous, i.e., the film will be pitted and will exhibit "orange peel." On the other hand, at highly alkaline pH's, the epoxy amine salt becomes very stable with the result that curing of the film is retarded because the pendant carboxyl groups are not as readily available to catalyze the reaction between the modified epoxy resin and the ester compound components and the cross-linking agent. As will be understood from the foregoing, it is necessary that the film-forming composition have an alkaline pH, but that the latter should be relatively low. Preferably, the pH of the film-forming composition should be between about 7.5 and about 8.5. The concentrate pH will be essentially the same as that of the film-forming composition although the concentrate could have a slightly higher or lower pH than the film-forming composition depending upon the acidity or alkalinity of the water to be added to the concentrate to produce the latter. The amount of amine to be included in the concentrate or film-forming composition to provide the required pH can be readily determined knowing the acid number of the concentrate.

The modified epoxy resin (or its amine salt) is reduced with coupling solvent (and any other solvents for the epoxy that may be employed) to obtain a desired viscosity for handling purposes. The amount of coupling solvent employed can vary widely with good results. The actual amount used in any particular application will depend upon such factors as the solids content of the film-forming composition, the local air pollution standards, line coating characteristics, etc. Although a wide range of coupling solvent concentrations can be used, it is to be understood that there is a minimum amount which is that amount required to provide a stable water/coupling solvent system to ensure that a continuous, smooth coating is produced. At the other end of the spectrum, if too much coupling solvent is used in relation to water, the value of the described coating composition as a means of reducing air pollution will be lost. Of the solvent content, 80% or more can be water with the remainder being coupling solvent to meet air pollution requirements.

The various coatings components, except for most of the water, are mixed together to provide the concentrate. The ratio of ester compound to modified epoxy resin to cross-linking agent in the concentrate may vary within certain limits. Those limits are governed primarily by the water solubility of the concentrate and by the cure characteristics of the film-forming composition. Unfortunately, an improvement in one of these often produces a loss or reduction in the other. For example, water solubility can be improved in some cases by using more amine or coupling solvent; however, increasing the amine can cause retardation of the cure and an increase in coupling solvent can have an adverse effect on the stability of the film-forming compostion as well as on air quality.

Preferably, a weight ratio of ester compound to modified epoxy resin to cross-linking agent (melamine) of about 1:1:0.5–0.3, respectively, is employed. Within this range, very good water solubility is obtained together with good cure. However, a broader range of ester compound to modified epoxy resin to cross-linking agent between about 2:1:0.5–0.3, respectively, and about 1:2:0.5–0.3, respectively, can be employed with satisfactory results.

After the concentrate is made up as described and the desired amount of water is added thereto, the resulting film-forming composition may be coated on various substrates using techniques well known in the art, including the use of sprays, to provide the desired weight and thickness of film. Thereafter, the coating can be cured as is also well known. For example, a typical cure is two minutes at 400° F. If the product with the cured coating is further coated with, for example, top coats and inks, further curing of the base coat will take place during curing of the top coat and inks.

This invention will be further described with reference to the following Examples. As used in the Examples, the term "part(s)" means parts by weight unless otherwise stated.

EXAMPLE 1

A low molecular weight ester compound composition and a modified epoxy resin composition were made up as follows.

Ester Compound Composition

To a reactor fitted with stirrer, heater and inert gas connections, there was added 375 parts of triethylene glycol, 370 parts of phthalic anhydride and 300 parts of trimethylolethane. The reactor was then purged of oxygen with a strong flow of inert gas (carbon dioxide) after which heating was initiated to melt the solid phthalic anhydride and trimethylolethane. After this melting was completed, the stirrer was turned on to agitate the reaction mixture and the inert gas flow was reduced to a light sparge. Heating was increased to raise the temperature of the reactants to about 250° C (460° F). This temperature was held until an acid value of less than 12 was obtained, after which the reactor was cooled and the reaction product was reduced to 90% theoretical nonvolatiles with distilled water. The latter was accomplished by adding 111 parts of water to the reaction product. The resulting water-reduced composition is referred to hereinafter as "ester composition R."

Ester composition R was characterized by a viscosity (Gardner-Holdt) of Y–Z with an acid value on the non-volatile material of 9–12 and a density of 10.1 pounds per gallon.

Modified Epoxy Resin Composition

To a reactor fitted as described above, there was added 725.48 parts of Araldite 7071 (a bisphenol A/epichlorohydrin epoxy resin of about 500 epoxy equivalent weight made by Ciba). The latter was melted on the reactor vessel under an inert gas (carbon dioxide) blanket. Thereafter, the inert gas flow was stopped and 185.22 parts of benzoic acid and 0.2 parts of anhydrous sodium carbonate (as a catalyst to minimize epoxide polymerization) were charged to the reactor. Heating was restarted and the temperature of the reactor contents was raised to about 237° C (460° F). A reflux trap connected to the reactor was filled with ten parts of toluol sufficient to maintain a very light reflux at the reaction temperature of 237° C. These conditions were maintained until an acid number on the solids of about 8 was obtained. Thereafter, the reactor contents were cooled to 163° C (325° F), after which 88 parts of succinic anhydride were added to the reactor. The temperature of the reactor was then held in the range between about 140° C to 145° C (285°–295° F) for about 1.5 hours. After this time, the acid value of the solvents was between 50 and 60. The reactor contents were then reduced to 60% by weight non-volatile material with the addition of 532.8 parts of butyl Cellosolve and 133.2 parts of diacetone alcohol. This composition is hereafter referred to as "epoxy composition S."

Epoxy composition S had a viscosity of Z3 – Z5, a solids acid number of 50–60 and a density of 8.85 pounds per gallon.

Ester composition R and epoxy composition S were combined with hexamethoxymethyl melamine (HMMM), DEEA, butyl Cellosolve and distilled water in the proportions shown in Table 1 to make up film-forming compositions, A, B, C, D and E having the same percentage (of non-volatiles) of HMMM, but having different ratios of ester compound to modified epoxy resin as shown in Table 1.

The clarity and water reducibility of film-forming compositions A-E were checked on day one and were further checked on day two with the results shown in Table 1.

Table 1 shows that film-forming compositions A and B initially exhibited suspension characteristics as shown by the production of a Tyndall effect, whereas compositions C-E did not. On standing for one day, compositions A and B became cloudy thus indicating some separation of solids from solvent, thereby indicating the relative instability of these two compositions. By comparison, compositions C-E remained clear.

All of the film-forming compositions were able to withstand 50% dilution (obtained by mixing 100 parts by volume of film-forming composition with 50 parts by weight of distilled water) without significant change after being formulated. However, again on the first day, 100% water dilution produced emulsification or phase separation of compositions A-C although the degree of phase separation decreased as the ratio of ester compound to modified epoxy resin decreased. Consistent with the latter observation, no separation occurred at 100% dilution of compositions D and E which were characterized by the lowest ester compound to modified epoxy resin ratio (1:1).

Upon standing for approximately 24 hours, each of compositions A-E was diluted 100% with water, and again compositions A-C showed emulsification, whereas compositions D and E remained clear.

In general, the water dilution test data in Table 1 show that at higher ratios of ester compound to modified epoxy resin (constant melamine concentration based on solids), the resulting film-forming compositions are not commercially useful. More specifically, at 20% (solids basis) melamine cross-linking agent concentration, ester compound to modified epoxy resin ratios of 7:1 and 3:1 produced commercially unacceptable film-forming compositions because of their inability to provide stability and tolerance to water dilution. At a ratio of 5:3 (composition C), the resulting composition is commercially useful provided that it is not subjected to extreme water dilution (e.g., 100% dilution) as such compositions may be subjected to coatings operations using wet cans direct from the washer. At an ester compound to modified epoxy resin ratio of 1:1, the resulting compositions (illustrated by D and E) exhibit excellent water dilution characteristics even over a wide range of solids (non-volatile) concentration. It is to be noted that composition E has twice the solids content of composition D.

TABLE 1

|  | Composition and Amount (parts by wt.) | | | | |
| --- | --- | --- | --- | --- | --- |
|  | A | B | C | D | E |
| Ester Comp. R | 78 | 67 | 56 | 44 | 88 |
| Epoxy Comp. S | 17 | 33 | 50 | 67 | 134 |
| HMMM | 20 | 20 | 20 | 20 | 40 |
| DEEA | 7 | 7 | 7 | 7 | 14 |
| Butyl Cellosolve | 93 | 87 | 80 | 73 | 146 |
| Distilled Water | 285 | 286 | 287 | 289 | 78 |
| % Composition of Vehicle Solids | | | | | |
| Ester Cmpd. | 70 | 60 | 50 | 40 | 40 |
| Mod. Epoxy Resin | 10 | 20 | 30 | 40 | 40 |
| HMMM | 20 | 10 | 20 | 20 | 20 |
| % Non-Volatiles | 20 | 20 | 20 | 20 | 40 |
| pH at 25° C | 9.5 | 9.3 | 9.0 | 8.65 | 8.46 |
| Visc. (sec.) at 25° C (No. 1 Zahn) | 28.5 | 29.0 | 30.0 | 30.6 | 73 |
| Day 1 | | | | | |
| Clarity | Tyndall | Less Tyndall | Clear | No Tyndall | |
| Water Dilution | | | | | |
| 50% by vol. | | | Clear | | |
| 100% by vol. | Kickout | Less Kickout | Slight Kickout | Clear | Clear |
| Day 2 | | | | | |
| Clarity | Cloudy | Slightly Cloudy | Clear | Clear | Clear |
| Water Dilution | | | | | |
| 100% by vol. | Cloudy | Cloudy | Slightly Cloudy | Clear | Clear |

EXAMPLE 2

A low molecular weight ester compound composition (designated as "ester composition T") was first formulated as follows.

To a reactor fitted as described in Example 1 and purged with carbon dioxide, there was charged 685 parts of trimethylolethane and 100 parts of water. The reactor contents were heated to 140° C (250° F), and this temperature was held for a time sufficient to dissolve the trimethylolethane. The reaction mass was then cooled to 94° C (200° F) and agitation of the reaction mass was started. Then, 417 parts of adipic acid were added and the reactor contents were heated to 226° C (440° F) and held at the latter temperature for a time sufficient to produce an acid value on the solids of 4 and a viscosity of W at 80% non-volatiles in methyl Cellosolve. The reactor contents were then cooled to 82° C (180° F) and reduced with sufficient distilled water to provide a 90% solids composition.

Ester composition T (90% solids) had a Gardner-Holdt viscosity of Y-Z1 and a density of 9.8 pounds per gallon.

The ester composition T, along with ester composition R, and epoxy resin composition S of Example 1 were used to formulate three film-forming compositions F, G and H as shown in Table 2. The latter film-forming compositions had a vehicle solids content of 20% by weight.

TABLE 2

| | Composition and Amount (parts by wt.) | | |
|---|---|---|---|
| | F | G | H |
| Ester Comp. R | 77.8 | — | 94 |
| Ester Comp. T | — | 77.8 | — |
| Epoxy Comp. S | 25.0 | 25.0 | — |
| HMMM | 15.0 | 15.0 | 15.0 |
| Butyl Cellosolve | 60.0 | 60.0 | 60.0 |
| Distilled Water | 314.4 | 314.4 | 324 |
| Beckosol 13-420 (50% sol'n) | 0.82 | 0.82 | 0.82 |
| DEEA | 7.0 | 7.0 | 7.0 |
| Para toluene sulphonic acid (20%) | | | 0.2 cc |
| % of Vehicle Solids | | | |
| Ester cmpd. | 70 | 70 | 85 |
| Mod. epoxy resin | 15 | 15 | — |
| HMMM | 15 | 15 | 15 |

Compositions F and G were both clear; however, composition H was cloudy and the solids kicked out upon standing making the latter composition (without epoxy) unsuitable for can coating use.

Compositions F and G were coated on aluminum and cured at 205° C (400° F) for two minutes. Although both cured films withstood contact with beer for 20 minutes at 82.5° C (180° F) and (separately) with water for 45 minutes at 82.5° C without visible effect, they both were slightly tacky, indicating that each should have had a higher percentage of modified epoxy resin. That is, the ratio of ester compound to modified epoxy resin was somewhat too high. Also, if a solids content lower than 20% had been used, both compositions F and G would have become cloudy and unusable because of phase separation, i.e., they would not accept water dilution. Consequently, compositions F, G and H would not be suitable for use as beverage container linings.

EXAMPLE 3

A water-free film-forming composition (J) was made up without using any ester compound by combining 774 parts of epoxy resin composition S with 82 parts of HMMM, 22 parts of Cellosolve acetate, 36 parts of MEK, 12 parts of 2-ethyl hexanol, 12 parts of mineral spirits, 56 parts of DEEA, and 6 parts of Beckosol 13-420. Composition J had a pH of 8.35 and a viscosity (No. 5 Zahn) of 105 sec. at 24° C. Its modified epoxy resin to HMMM weight ratio was 85:15 and the solids content was 55% by weight.

A portion of composition J was diluted with distilled water to provide an 18.3% solids composition (K) and a 12.5% solids composition (L).

Each of compositions K and L was coated on aluminum cans using a flooding technique. The coated cans were cured at 205° C (400° F) for 2 minutes.

The cured coating from composition K exhibited blistering on the interior of the can dome and along the edges of the can mouth. Additionally, composition K showed a strong tendency to entrap air and it foamed excessively during application to the containers.

The cured coating from composition L was generally good except that there were discontinuities in the coating indicating poor flow. Furthermore, composition L foamed also.

The foaming and flow problems exhibited by compositions K and L are unexpectedly solved by inclusion of the hereindescribed low molecular weight ester compound as is shown in Example 4.

EXAMPLE 4

Two film-forming compositions M and N were made up by combining the constituents shown in Table 3. As shown by Table 3, the ratio of ester compound to modified epoxy resin in each case was 1:1. However, the ratio of ester compound to HMMM in composition M was 2.83:1, whereas the ratio of ester compound to HMMM in composition N was 4.5:1.

Composition M exhibited infinite dilution with water, whereas composition N became slightly cloudy when reduced with water to a concentration of 25 cc of concentrate in 250 cc. of water.

After each film-forming composition was coated on aluminum and cured at 205° C for 2 minutes, the resulting coatings were subjected to an acetone rub for one minute. The coating made from composition M showed no effect, whereas the coating made from composition N came off immediately. The composition M-derived coating also was not affected by water, whereas the composition N-derived coating was significantly affected by water so that the latter is not useful as a container lining. Composition M showed freedom from dome blistering, foaming, flow problems, etc., and is also capable of withstanding dilution caused by the presence of water on the cans as they come directly from the washer. Finally, composition M is hydrolytically stable and is capable of being used successfully after long term storage.

TABLE 3

| | Composition and Amount (parts by wt.) | |
|---|---|---|
| | M | N |
| Ester Comp. R | 47 | 50 |
| Epoxy Comp. S | 71 | 75 |
| Butyl Cellosolve | 45 | 43 |
| DEEA | 7 | 7 |
| Distilled Water | 65 | 65 |
| HMMM | 15 | 10 |
| % of Vehicle Solids | | |
| Ester cmpd. | 42.5 | 45 |
| Mod. epoxy resin | 42.5 | 45 |
| HMMM | 15.0 | 10 |
| pH at 24° C | 8.35 | 7.75 |
| Visc. (No. 1 Zahn at 24° C) | 90 sec. | 100 sec. |

As shown by the foregoing description and Examples, there has been described a water-soluble concentrate which, when combined with water, produces a heat-curable, water-based, film-forming composition which is particularly suitable as a food can coating and which is especially adaptable to coatings operations in which the cans come directly from the washer. The unique properties of the film-forming composition result from the combination of components present in the concentrate which comprises, as described, a low molecular weight ester compound (which also functions as a solvent for the modified epoxy resin), a modified bisphenol/epichlorohydrin epoxy resin having pendant carboxyl groups, an aliphatic amine having a boiling point lower than the film-forming composition cure temperature for forming a salt with the modified epoxy resin and to provide a film-forming composition pH which is alkaline (but not excessively alkaline), so that it will not substantially retard cure of the latter composition, a cross-linking agent which is reactive with hydroxyl groups and which has 4–6 reactive sites per molecule to provide a highly densely cross-linked cured coating, but which is preferably a hexa alkoxy methyl melamine, and a coupling agent having a boiling point higher than water and which is a solvent for the modified epoxy resin so that after the water has been substantially evaporated from the film-forming composition, the modified epoxy resin will remain in solution to provide good flow characteristics.

As used in the claims, the term "saturated" when used to describe the dicarboxylic acid anhydrides used in making the modified epoxy resin means saturated aliphatic dicarboxylic acid anhydrides and aromatic dicarboxylic acid anhydrides which do not polymerize as do unsaturated aliphatic dicarboxylic anhydrides. Included among such aromatic dicarboxylic acid anhydrides are the aromatic dicarboxylic acid anhydrides, hydrogenated aromatic dicarboxylic acid anhydrides, and the foregoing aromatic anhydrides having saturated aliphatic substituents.

We claim:

1. A water-soluble concentrate suitable for the formulation, with water, of a heat-curable, film-forming composition, said concentrate comprising:
    a low molecular weight ester compound having a maximum molecular weight of about 700 and being reducible with water at pH 7 to at least about 80% by weight of non-volatile material, said ester compound being the condensation product of (a) at least one polycarboxylic acid having 2–3 carboxyl groups, and anhydrides thereof with (b) at least one polyol having 2–4 hydroxyl groups and having 2 to about 7 carbon atoms, said polycarboxylic acid and said polyol being present in a molar ratio sufficient to provide at least about a 100% excess of said hydroxyl groups over said carboxyl groups;
    a heat-reversible, water-soluble, epoxy amine salt consisting essentially of the reaction product of
    i. an aliphatic amine having a boiling point less than the temperature used to cure said film-forming composition, said amine being present in said concentrate in amount sufficient to provide said film-forming composition with an alkaline pH which will not substantially retard cure of said film-forming composition, and
    ii. a modified epoxy resin having pendant carboxyl groups attached thereto, said modified epoxy resin being the half-ester reaction product made by the heating of a saturated dicarboxylic acid anhydride with an epoxy resin partial ester at a temperature less than that temperature at which the pendant carboxylic acid generated reacts with said epoxy resin partial esters, said saturated dicarboxylic acid anhydride being present in an amount with respect to said epoxy resin partial ester to provide said modified epoxy resin with an acid number between about 40 and about 70, said epoxy resin partial ester being the reaction product obtained by the heating of a monocarboxylic acid with a low molecular weight bisphenol/epichlorohydrin epoxy resin at a temperature sufficient to minimize polymerization of said epoxy resin with itself and to promote the reaction of said monocarboxylic acid with said epoxy resin, said monocarboxylic acid being used in at least about a stoichiometric amount with respect to said epoxy resin;
    a cross-linking agent reactive with hydroxyl groups for reaction with said ester compound and with said modified epoxy resin to provide a densely cross-linked cured coating, said cross-linking agent having from 4–6 reactive sites per molecule and being a material selected from the group consisting of melamines and ureas having pendant alkoxy and alkylol substituents available for reaction with said hydroxyls, said alkoxy and alkylol substituents having from 1–4 carbons; and
    an organic coupling solvent for coupling said modified epoxy resin with said water, said coupling solvent having a boiling point such that it remains in the film during cure until after substantially all of the water has been evaporated therefrom, said coupling solvent being present in an amount sufficient to provide a stable water/coupling solvent system to produce continuous cured films;
    with the weight ratio of said ester compound/modified epoxy resin/cross-linking agent being between about 2:1:0.5–0.3 and about 1:2:0.5–0.3, respectively.

2. The concentrate of claim 1 wherein said cross-linking agent is selected from the group consisting of hexa alkoxy methyl melamines and tetra alkylol ureas.

3. The concentrate of claim 1 wherein said coupling solvent is a solvent for said modified epoxy resin and wherein said coupling solvent has a boiling point higher than that of water.

4. The concentrate of claim 1 wherein said amine is a tertiary amine.

5. The concentrate of claim 1 wherein said pH is between about 7.5 and about 8.5.

6. A heat-curable, film-forming composition comprising the concentrate of claim 1 and water, said water comprising a substantial portion of the volume of non-volatiles in said film-forming composition.

7. The film-forming composition of claim 6 wherein said water comprises at least about 80% by volume of the total volume of said volatiles in said film-forming composition.

8. A water-soluble concentrate suitable for the formulation, with water, of a heat-curable, film-forming composition, said concentrate comprising:
    a low molecular weight ester compound having a maximum molecular weight of about 700 and being reducible with water at pH 7 to at least about 80% by weight of non-volatile material, said ester compound being the condensation product of (a) at least one polycarboxylic acid having 2–3 carboxyl groups, and anhydrides thereof with (b) at least one polyol having 2–4 hydroxyl groups and having 2 to about 7 carbon atoms, said polycarboxylic acid and said polyol being present in a molar ratio sufficient to provide at least about a 100% excess of said hydroxyl groups over said carboxyl groups;
    a heat-reversible, water-soluble, epoxy amine salt consisting essentially of the reaction product of
    i. an aliphatic tertiary amine having a boiling point less than the temperature used to cure said film-forming composition, said amine being present in said concentrate in amount sufficient to provide said film-forming composition with an alkaline pH which will not substantially retard cure of said film-forming composition, and ii. a modified epoxy resin having pendant carboxyl groups attached thereto, said modified epoxy resin being the half-ester reaction product made by the heating of a saturated dicarboxylic acid anhydride with an epoxy resin partial ester at a temperature less than that temperature at which the pendant carboxylic acid generated reacts with said epoxy resin partial esters, said saturated dicarboxylic acid anhydride being present in an amount with respect to said epoxy resin partial ester to provide said modified epoxy resin with an acid number between about 40 and about 70, said epoxy resin partial ester being the reaction product obtained by the heating of a monocarboxylic acid with a bisphenol A/epichlorohydrin epoxy resin having a molecular weight less than about 1000 and an epoxy equivalent weight of about 500 at a temperature sufficient to minimize polymerization of said epoxy resin with itself and to promote the reaction of said monocarboxylic acid with said epoxy resin, said monocarboxylic acid being used in at least about a stoichiometric amount with respect to said epoxy resin;

a cross-linking agent reactive with hydroxyl groups of said ester compound and said modified epoxy resin to provide a densely cross-linked cured film, said cross-linking agent being a material selected from the group consisting of lower molecular weight hexa alkoxy methyl melamines and tetra alkylol ureas wherein said alkoxy and alkylol substitutents have 1–4 carbons; and an organic coupling solvent for coupling said modified epoxy resin with said water, said coupling solvent being a solvent for said modified epoxy resin and having a boiling point such that it remains in the film during cure until after substantially all of the water has been evaporated therefrom, said coupling solvent being present in an amount sufficient to provide a stable water/coupling solvent system to produce continuous cured films;

with the weight ratio of said ester compound/modified epoxy resin/cross-linking agent being between about 2:1:0.5–0.3 and about 1:2:0.5–0.3, respectively.

9. The concentrate of claim 8 wherein said ester compound has a hydroxyl functionality between about 3 and about 4.

10. The concentrate of claim 8 wherein said ester compound is selected from the group consisting of diester, triester and tetraester compounds.

11. The concentrate of claim 8 wherein said polyol contains at least one ether linkage.

12. The concentrate of claim 8 wherein said polycarboxylic acid is aromatic.

13. The concentrate of claim 8 which includes an amount of amine sufficient to provide said film-forming composition with an alkaline pH between about 7.5 and about 8.5.

14. The concentrate of claim 13 wherein said amine is selected from the group consisting of diethylethanolamine, dimethylaminomethyl propanol, and dimethylethanolamine.

15. The concentrate of claim 8 wherein said monocarboxylic acid is selected from the group consisting of benzoic acid, tertiary butyl benzoic acid, and stearic acid.

16. The concentrate of claim 15 wherein said dicarboxylic acid anhydride is selected from the group consisting of succinic anhydride, phthalic anhydride and trimellitic anhydride.

17. The concentrate of claim 8 wherein said coupling solvent has a boiling point above that of water.

18. The concentrate of claim 17 wherein said coupling solvent is selected from the group consisting of diacetone alcohol, 2-butoxyethanol and ethylene glycol monoethyl ether acetate.

19. A heat-curable, film-forming composition comprising the concentrate of claim 8 and water, said water comprising a substantial portion of the volume of non-volatiles in said film-forming composition.

20. The film-forming composition of claim 19 wherein said water comprises at least about 80% by volume of the total volume of said volatiles in said film-forming composition.

21. The film-forming composition of claim 20 wherein said water has substantially no metal content.

22. A water-soluble concentrate suitable for the formulation, with water, of a heat-curable, film-forming composition for metal food containers, said concentrate comprising:

a low molecular weight ester compound having a hydroxyl functionality between about 3 and about 4, maximum molecular weight of about 700, and being reducible with water at pH 7 to at least about 80% by weight of non-volatile material, said ester compound being the condensation product of (a) at least one aromatic polycarboxylic acid having 2–3 carboxyl groups, and anhydrides thereof with (b) at least one aliphatic polyol having 2–4 hydroxyl groups and having 2 to about 7 carbon atoms, said polycarboxylic acid and said polyol being present in a molar ratio sufficient to provide at least about a 100% excess of said hydroxyl groups over said carboxyl groups;

a heat-reversible, water-soluble, epoxy amine salt consisting essentially of the reaction product of i. an aliphatic tertiary amine having a boiling point less than the temperature used to cure said film-forming composition, said amine being present in said concentrate in amount sufficient to provide said film-forming composition with an alkaline pH between about 7.5 and about 8.5, and ii. a modified epoxy resin having pendant carboxyl groups attached thereto, said modified epoxy resin being the half-ester reaction product made by the heating of a saturated dicarboxylic acid anhydride with an epoxy resin partial ester at a temperature less than that temperature at which the pendant carboxylic acid generated reacts with said epoxy resin partial esters, said saturated dicarboxylic acid anhydride being present in an amount with respect to said epoxy resin partial ester to provide said modified epoxy resin with an acid number between about 40 and about 70, said epoxy resin partial ester being the reaction product obtained by the heating of a monocarboxylic acid with a bisphenol A/epichlorohydrin epoxy resin having a molecular weight less than about 1000 and an epoxy equivalent weight of about 500 at a temperature sufficient to minimize polymerization of said epoxy resin with itself and to promote the reaction of said monocarboxylic acid with said epoxy resin, said monocarboxylic acid being used in at least about a stoichiometric amount with respect to said epoxy resin;

a cross-linking agent reactive with hydroxyl groups of said ester compound and said modified epoxy resin to provide a densely cross-linked cured coating, said cross-linking agent having 4–6 reactive groups per molecule and being a material selected from the group consisting of melamines and ureas having pendant alkoxy and alkylol substituents available for reaction with said hydroxyls, said alkoxy substituent having from 1 to about 4 carbon atoms and said alkylol substituent having from 1 to about 3 carbon atoms; and an organic coupling solvent for coupling said modified epoxy resin with said water, said coupling solvent being a solvent for said modified epoxy resin and having a boiling point above that of water, but below the cure temperature of said film so that it remains in the film during cure until after substantially all of the water has been evaporated therefrom, said coupling solvent being present in an amount sufficient to provide a stable water/coupling solvent system to produce continuous cured films;

with the weight ratio of said ester compound/modified epoxy resin/cross-linking agent being between about 2:1:0.5–0.3 and about 1:2:0.5–0.3, respectively.

23. The concentrate of claim 22 wherein said modified epoxy resin has an acid number between about 50 and about 60.

24. The concentrate of claim 23 wherein said ratio of said ester compound/modified epoxy resin/cross-linking agent is about 1:1:0.5–0.3, respectively.

25. The concentrate of claim 24 wherein said polyol contains at least one ether linkage.

26. The concentrate of claim 22 wherein said amine is selected from the group consisting of diethylethanolamine, dimethylaminomethyl propanol, and dimethylethanolamine.

27. The concentrate of claim 26 wherein said monocarboxylic acid is selected from the group consisting of benzoic acid, stearic acid, and tertiary butyl benzoic acid and said dicarboxylic acid anhydride is selected from the group consisting of succinic anhydride, phthalic anhydride, and trimellitic anhydride.

28. The concentrate of claim 27 wherein said coupling solvent is selected from the group consisting of diacetone alcohol, 2-butoxyethanol and ethylene glycol monoethyl ether acetate.

29. The concentrate of claim 28 wherein said cross-linking agent is hexamethoxy methyl melamine.

30. A heat-curable, film-forming composition comprising the concentrate of claim 22 and water, said water comprising at least about 80% by volume of the total volume of said volatiles in said film-forming composition.

31. The film-forming composition of claim 30 wherein said water is substantially free of metal.

32. The concentrate of claim 1 which further includes: a low-boiling organic material which forms an azeotropic composition with water which is a solvent for said modified epoxy resin, said material being selected from the group consisting of methyl ethyl ketone, acetone and ethyl acetate.

33. The concentrate of claim 8 which further includes: a low-boiling organic material which forms an azeotropic composition with water which is a solvent for said modified epoxy resin, said material being selected from the group consisting of methyl ethyl ketone, acetone and ethyl acetate.

34. The concentrate of claim 22 which further includes: a low-boiling organic material which forms an azeotropic composition with water which is a solvent for said modified epoxy resin, said material being selected from the group consisting of methyl ethyl ketone, acetone and ethyl acetate.

* * * * *